(12) United States Patent
Dawson et al.

(10) Patent No.: US 11,510,092 B1
(45) Date of Patent: Nov. 22, 2022

(54) REQUESTING UPGRADED QUALITY OF SERVICE (QOS) DELIVERED VIA TEMPORARY SPECTRUM ALLOCATION

(71) Applicant: T-MOBILE INNOVATIONS LLC, Overland Park, KS (US)

(72) Inventors: Peter Dawson, Portsmouth, NH (US); Ronald R. Marquardt, Woodinville, WA (US); Mark Moore, Franklin, TN (US); Lyle Paczkowski, Mission Hills, KS (US)

(73) Assignee: SPRINT COMMUNICATIONS COMPANY LP, Overland Park, KS (US)

( * ) Notice: Subject to any disclaimer, the term of this patent is extended or adjusted under 35 U.S.C. 154(b) by 54 days.

(21) Appl. No.: 17/023,749

(22) Filed: Sep. 17, 2020

(51) Int. Cl.
| | |
|---|---|
| *H04W 28/02* | (2009.01) |
| *H04W 8/02* | (2009.01) |
| *H04L 47/28* | (2022.01) |
| *H04W 24/08* | (2009.01) |
| *H04L 67/75* | (2022.01) |

(52) U.S. Cl.
CPC ....... *H04W 28/0268* (2013.01); *H04L 47/286* (2013.01); *H04L 67/75* (2022.05); *H04W 8/02* (2013.01); *H04W 24/08* (2013.01)

(58) Field of Classification Search
CPC ... H04W 28/0268; H04W 8/02; H04W 24/08; H04L 47/286; H04L 67/36
See application file for complete search history.

(56) References Cited

U.S. PATENT DOCUMENTS

| | | | | |
|---|---|---|---|---|
| 11,218,854 B2 * | 1/2022 | Raleigh | ................ | G06F 3/0482 |
| 2009/0135731 A1 * | 5/2009 | Secades | ................ | H04W 24/10 |
| | | | | 370/252 |
| 2014/0220967 A1 * | 8/2014 | Pankajakshan | ........ | H04W 48/18 |
| | | | | 455/432.1 |
| 2017/0201850 A1 * | 7/2017 | Raleigh | ................ | G06F 3/0482 |
| 2020/0045519 A1 * | 2/2020 | Raleigh | ................ | G06F 3/0482 |

* cited by examiner

*Primary Examiner* — Jung H Park

(57) ABSTRACT

A mobile communication device for receiving an ad hoc temporary upgrade in quality of service (QoS). The mobile communication device comprises a processor, at least one cellular radio transceiver, a non-transitory memory, and an ad hoc service upgrade application. When executed by the processor, the application monitors wireless cellular communication on a network via the at least one cellular radio transceiver, detects a significant delay in the communication, generates a prompt on a GUI, the prompt comprising a plurality of options for an ad hoc temporary upgraded QoS, where each option is associated with a time period. The application further, based on a user input, requests a preferred roaming list (PRL) associated with the temporary upgraded QoS, receives the PRL, wherein the PRL is associated with providing the upgraded QoS on an allocated spectrum, activates the received PRL, and upon expiration of the time period, deactivates the received PRL.

19 Claims, 9 Drawing Sheets

REQUESTING UPGRADED QUALITY OF SERVICE (QOS) DELIVERED VIA TEMPORARY SPECTRUM ALLOCATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are widely deployed and used by people in all walks of life in the United States and other nations. Mobile communication devices provide both voice communication services and data communication services. These communication services may be supported by payments from subscribers to a communication service provider. There are many different models for distributing the costs of providing wireless communication services to subscribers. For example, subscribers may pay a monthly fee to a service provider for service according to a service plan. Different tiers of service plans may define limits for volume of usage, and overage charges may be added to the normal monthly fee if the user exceeds these limits. Other subscribers pre-pay for their wireless communication service according to a specified usage volume per payment. As the pre-paid user's volume of wireless communication usage reaches or exceeds the service volume the user has paid for, the wireless communication service provider may deny ordinary service coverage (except for emergency calls) to that user until he or she has provided an additional pre-paid amount.

SUMMARY

In an embodiment, a mobile communication device for receiving an ad hoc temporary upgrade in quality of service (QoS) is described. The mobile communication device comprises a processor, at least one cellular radio transceiver, a non-transitory memory, and an ad hoc service upgrade application stored in the non-transitory memory. When executed by the processor, the ad hoc service upgrade application monitors wireless cellular communication on a network operated by a service provider via the at least one cellular radio transceiver, detects a significant delay in the wireless cellular communication, and generates a prompt on a graphic user interface (GUI) on the mobile communication device, the prompt comprising a plurality of options for an ad hoc temporary upgraded QoS, where each option is associated with a period of time. The ad hoc service upgrade application further, based on a user input selection to receive a temporary upgraded QoS for a predetermined period of time, requests a preferred roaming list (PRL) associated with the temporary upgraded QoS from a PRL server in the network, receives the PRL from the PRL server, wherein the PRL comprises system identifiers and network identifiers associated with providing the upgraded QoS on an allocated spectrum of the network, activates the received PRL, wherein activating the received PRL provides a temporary upgraded QoS to the mobile communication device for the predetermined period of time, and upon expiration of the predetermined period of time, deactivates the received PRL.

In another embodiment, a method of providing an ad hoc temporary upgrade in quality of service (QoS) to a mobile communication device is described. The method comprises requesting a token from a token server operating on a network maintained by a service provider, by an ad hoc service upgrade application executing on a processor of the mobile communication device, based on the request, creating the token by the token server, where the token is associated with a time to live (TTL), storing a record of the token in a token data store, and transmitting the token to the mobile communication device by the token server, wherein the token is stored in a non-transitory memory of the mobile communication device. The method further comprises receiving, by the token server, a communication request for a temporary upgrade in service based on the token from the mobile communication device, validating the communication request based on the token with the record of the token in the token data store by the token server, and granting, by the token server, the temporary upgraded QoS requested by the communication request, wherein upon expiration of the TTL, the temporary upgraded QoS reverts.

In yet another embodiment, a method of providing an ad hoc temporary upgrade in quality of service (QoS) to a mobile communication device is disclosed. The method comprises monitoring, by an ad hoc service upgrade application executing on a processor of the mobile communication device, wireless cellular communication via one or more cellular radio transceivers, detecting, by the ad hoc service upgrade application, a significant delay in wireless cellular communication on a network operated by a service provider, and generating a prompt by the ad hoc service upgrade application on a graphic user interface (GUI) on the mobile communication device, the prompt comprising a plurality of options for an ad hoc temporary upgraded QoS, where each option is associated with a period of time. The method further comprises based on a user input selection to receive a temporary upgraded QoS for a predetermined period of time, transmitting a request for a preferred roaming list (PRL) associated with the temporary upgraded QoS to a PRL server in the network by the ad hoc service upgrade application, wherein the PRL comprises system identifiers and network identifiers associated with providing the upgraded QoS on an allocated spectrum of the network operated by the service provider to the mobile communication device, receiving the PRL by the ad hoc service upgrade application, activating the received PRL by the ad hoc service upgrade application, wherein activating the received PRL provides a temporary upgraded QoS to the mobile communication device for the predetermined period of time, and upon expiration of the predetermined period of time, deactivating the received PRL by the ad hoc service upgrade application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
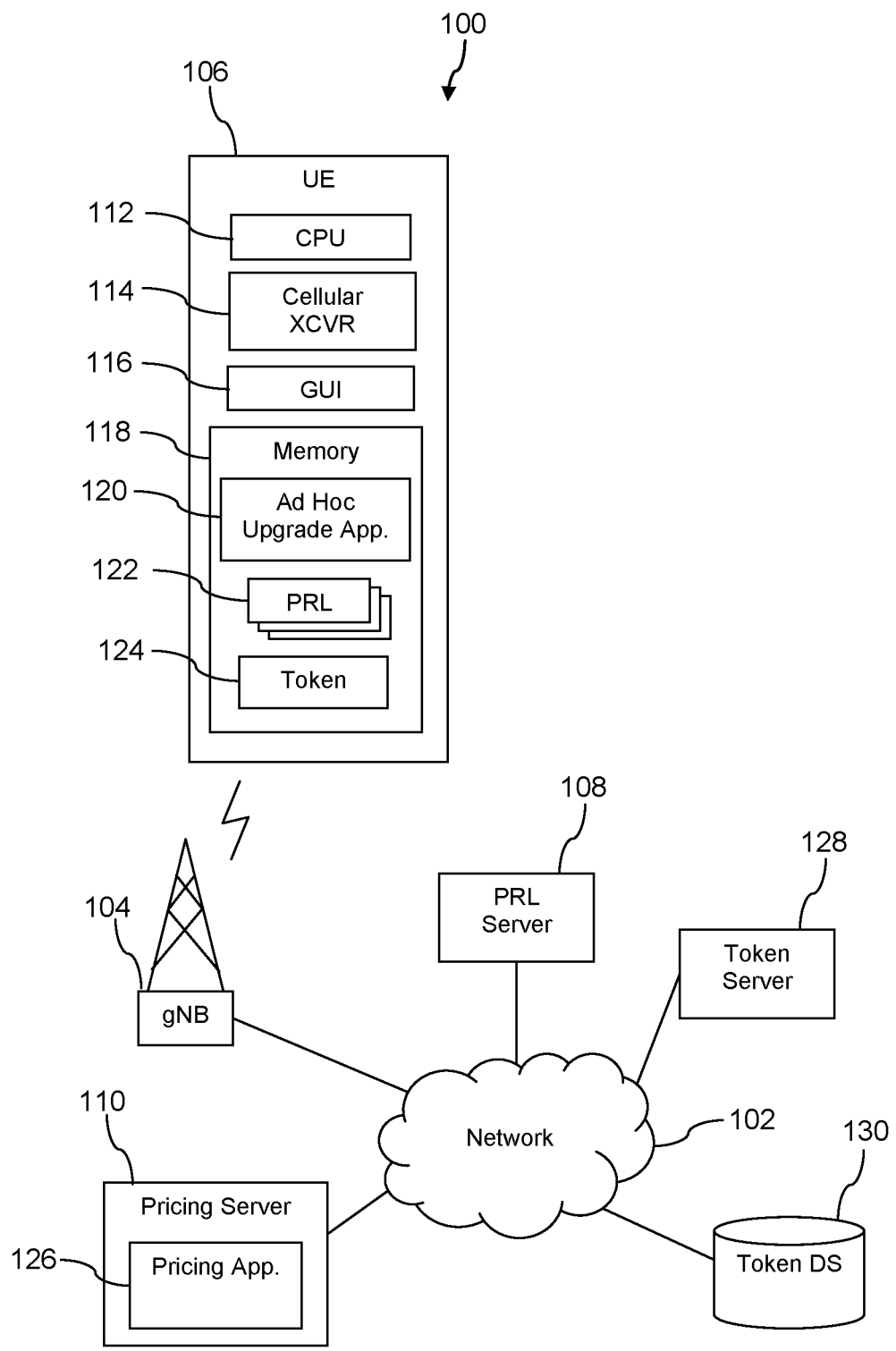
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless communication networks are used to provide various types of communication content such as voice, data, and video services. Advancements in wireless communication device technologies have led to wireless communication networks also supporting services such as video streaming, web browsing, and online gaming. Because these services call for different bandwidth and quality of service requirements, they may cause network problems for the service provider. Typical wireless communication systems may be multiple-access systems capable of supporting communication with multiple wireless communication devices by sharing available system resources (e.g., bandwidth, transmit power).

Generally, wireless multiple-access communication systems may simultaneously support communication for multiple mobile devices. Each mobile device may communicate with one or more cell towers. Further, communications between mobile devices and cell towers may be established via single-input single-output (SISO) systems, multiple-input single-output (MISO) systems, multiple-input multiple-output (MIMO) systems, and so forth. In addition, mobile devices can communicate with other mobile devices and cell towers can communicate with other cell towers in peer-to-peer wireless network configurations.

Service providers or wireless carriers bid on bands of available spectrum during a spectrum auction, where the government sells licenses for the right to transmit signals over specific bands of the electromagnetic spectrum. In the United States, the Federal Communications Commission (FCC) conducts these spectrum auctions, and the licenses may last for five to ten years. A service provider may bid and obtain one or more licenses for one or more bands of spectrum and provide wireless communication services over those bands for their subscribers. The service provider operates a radio access network (RAN) that includes a number of cell towers that provide wireless communication services to define one or more wireless coverage areas in which mobile devices and other types of user equipment (UE) can operate. Normally, a subscriber purchases service from a service provider, and the service provider assigns the subscriber a "home" coverage area to one of the networks that the carrier operates, as that customer's "home" area.

Subscribers may have varying levels of QoS requirements, so a service provider may offer different tiers of service through service plans at different price points, where a service plan may provide optimal, faster cellular service for an upcharge compared to a service plan that provides basic cellular service. While the customer remains in the geographic area serviced by the home area, he or she may be serviced by nearby cell towers operated by the service provider. However, as the subscriber roams, the subscriber's mobile device must register with and operate through other radio access networks, some of which are operated by the service provider and many of which are operated by other carriers. For example, as service providers purchase different bands of spectrum in different regions, there may be some geographical regions that one service provider has stronger cellular service and another service provider has limited cellular service. In another instance, a large crowd of people may gather, for example, for an event such as a sporting event, concert, parade, or holiday celebration. There may be thousands or hundreds of thousands of people congregated in a relatively small geographical area in which many mobile devices are competing for cellular service with the cell towers engaged to service that area.

A mobile device stores a "preferred roaming list" (PRL), which is a data file that includes a prioritized listing of communication systems (such as RANs) that the mobile device may access. Service providers may enter into roaming agreements with other service providers, for example, with service providers in different geographic areas so that when the subscriber travels outside the "home" area to a region where the subscriber's service provider does not offer cellular service, the subscriber nevertheless receives cellular service with a different service provider with whom the subscriber's service provider has entered into a roaming agreement. The PRL provides information about the preferred networks in the region to be offered to the mobile device. For each network listed in the PRL, the PRL may specify corresponding access data, such as radio frequency and system/network identification codes. Using that data, the mobile device may then search for a system (for example, by scanning the airwaves in search of a system) in the order that the systems are listed in its PRL, and may then attempt to register with the highest priority system it finds, proceeding down its PRL until it successfully connects with a system. However, whenever practical, the phone will stay on the most desirable system available, as directed by the subscriber's carrier. One or more PRLs may be preloaded onto a mobile device, additional PRLs may be loaded to the mobile device, and PRLs stored on a mobile device may also be updated and revised. Typically, a PRL is provided by the service provider and the subscriber does not have authority to edit the PRL.

In situations where numerous users are densely packed in a coverage area, available cell towers may become overloaded by the thousands or hundreds of thousands of mobile devices attempting to establish a link to the cell tower(s) and network performance issues result. Only a few users may ultimately successfully establish cellular connectivity, and even then, they may experience unreliable service due to repeated disconnecting and reestablishing wireless connection links with the network. A subscriber may wish to receive better cellular service that is not included in the service plan. Existing technology would require the subscriber to upgrade the subscriber's service plan, and the upgraded cellular service may not be available until the next day or a couple hours later. The present disclosure is directed to providing, at the subscriber's option, a temporary upgrade in quality of service (QoS) on an ad hoc basis to a wireless communication subscriber's mobile device in situations where the network may be overburdened or where the service does not align with the subscriber's standard cellular service plan.

When a subscriber enrolls in a cellular service plan with a service provider or wireless carrier, he or she may also purchase or receive a mobile device as part of their service plan that has one or more PRLs preloaded in the device's memory by the service provider. A mobile device may store more than one PRL at a given time. In an embodiment, a service provider may allocate a portion of spectrum it owns in a geographic area to provide a temporary upgrade in cellular service on an ad-hoc basis to subscribers. For example, the service provider may allocate five percent, ten percent, fifteen percent, or some other percentage of spectrum to provide a temporary, ad-hoc upgrade in cellular service to subscribers. In an embodiment, more than one mobile device may operate on the allocated spectrum. The allocated spectrum operates similarly to the non-allocated spectrum, where data is transmitted on a first-come, first-serve basis. A difference is that the allocated spectrum may have less network traffic so that the subscriber has fewer data streams to compete with in order to successfully send and/or receive cellular data. In an embodiment, the spectrum may be allocated dynamically based on the levels of cellular activity in the region. For example, when there are baseline levels of cellular activity, just two percent of the service provider's available spectrum may be allocated for providing temporary upgrades in cellular service, and when levels of cellular activity are elevated, the allocated portion may be dynamically increased to ten percent.

In an embodiment, a subscriber provisioned to receive a type of cellular service on a service provider's network may desire to receive a temporarily upgraded QoS, for example, if the subscriber travels or attends an event where many people are densely packed into a coverage area, and network resources become congested. For example, the subscriber may receive a temporarily upgraded QoS for two hours, four hours, twelve hours, one day, or some other period of time. The subscriber may attend a popular concert or parade and attempt to send a picture or video to his or her friends. Overburdened network resources may cause a delay in cellular service or a failure to send the data entirely. In an embodiment, an ad hoc service upgrade application executing on the mobile device may detect the network congestion and generate a prompt on a graphical user interface (GUI) of the mobile device, prompting the subscriber with the option to purchase a higher QoS for a limited period of time. In some embodiments, the ad hoc service upgrade application may be a distributed application. The prompt may provide a variety of time periods, each with a corresponding price. In an embodiment, the price may be dynamically determined by a server in the service provider's network based on a plurality of factors, such as the available network resources in the allocated spectrum, the number of subscribers in the coverage area, the demand for upgraded QoS, or other factors. In an embodiment, as more and more subscribers opt to receive a temporary upgraded QoS, the server may dynamically increase the price as the allocated spectrum experiences increased demand and higher traffic. In some instances, the option to pay for a temporary upgraded QoS may be paused in order to maintain the upgraded nature of the allocated spectrum and prevent it from experiencing network strain.

In an embodiment, the subscriber may decide to accept the higher QoS, and the service provider may send an alternative PRL on an ad hoc basis to the mobile device that contains system identifiers (SID) and/or network identifiers (NID) associated with providing the upgraded QoS on the allocated spectrum. In another embodiment, one or more alternative PRLs may be preloaded on the mobile device prior to the subscriber's travelling to another region. For example, when the subscriber regularly travels to a certain city for business or personal reasons, the service provider may preload an alternative PRL prior to travelling to be used for temporary upgraded QoS to the mobile device. Alternatively, the service provider may preload an alternative PRL based on activity from other subscribers in the region. For example, if other subscribers on the service provider's network are electing for temporary upgrades to QoS, the service provider may preload the alternative PRL on the subscriber's mobile device upon detecting that the subscriber has also travelled to the region. In some instances, preloading alternative PRLs may be determine based on a form of machine learning. In an embodiment, the preloaded PRLs may be based on different categories of users. The categories of users may be determined based on historical data associated with a subscriber's wireless communication habits, demographics information of the subscriber's account, or other factors.

In some instances, alternative PRLs may be transmitted or preloaded for certain categories of users who may be deemed to be privileged, for example, first responders or emergency services (e911). In an embodiment, transmitting or preloading alternative PRLs may be used for a temporary upgraded QoS in wireless communication services by the privileged user without seeking payment. For example, there may be instances when the network is congested because of a large event (e.g., Super Bowl or a hurricane) where calls to or from emergency services are failing or hampered by the overloaded network. Alternative PRLs may be transmitted or preloaded on the mobile device so that these emergency calls have a higher rate of success.

In an embodiment, the alternative PRL may be activated by the ad hoc service upgrade application to provide the temporary upgraded QoS on the mobile device. The ad hoc service upgrade application may deactivate the initial PRL and activate the alternative PRL that would allow the mobile device to operate on the service provider's allocated spectrum. The alternative PRL is activated for the period of time that the subscriber has opted to pay for (e.g., two hours) and upon expiration of the time limit, the ad hoc service upgrade application may deactivate the alternative PRL and re-activate the initial PRL, where the mobile device returns to standard operating conditions on the network based on the subscriber's service plan.

There may be situations where the mobile device may transmit a token to the network with a request to receive a temporary upgrade in service. While PRLs are typically designed to not be modified by a user, PRLs are susceptible to hacking and have minimal security and authentication procedures to prevent fraudulent usage. A service provider may verify the identity of the subscriber and mobile for billing purposes, but beyond this basic verification, other authentication procedures may not exist. Further, the identity verification process may take a significant period of time, such as one or two days, when the desire to receive a temporary upgraded QoS is more immediate. For instance, a user at a football game may only be interested in an upgraded QoS for the remaining three hours left of the game, and after that, he or she has no need for the upgraded QoS because either the network congestion has cleared up or the urgency for sending the cellular data has passed. Using a token associated with providing a temporary upgraded QoS on the allocated spectrum would allow a more efficient authentication process compared to traditional approaches so that fraudulent use of an alternative PRL may be thwarted, while still being able to provide a temporary upgraded QoS in a timely manner.

The token may incorporate a time to live (TTL), where upon expiration of the TTL, the network denies the request for the temporary upgrade in QoS. For example, a mobile device has an alternative PRL that the subscriber has legitimately obtained and paid for and used for the two hours of temporary upgraded QoS on the allocated spectrum. Upon expiration of the two hours, if the subscriber attempts to continue receiving cellular service on the allocated spectrum via the alternative PRL even though the two-hour time period has lapsed, the network may refuse the request based on the expired TTL of the token. The token with the TTL prevents unauthorized usage of the allocated spectrum by unauthorized users and subscribers with expired alternative PRLs. In an embodiment, records of the tokens and each token's TTL are stored in a blockchain and/or hyperledger in a data store, whereby authentically generated tokens may be securely and incorruptibly stored. In an embodiment, the blockchain may be maintained by the service provider. Storing records of tokens in the blockchain provides a more centralized and common location that allows the service provider to authenticate the token more efficiently. A plurality of copies of the blockchain may be stored in computer systems maintained by the service provider, for example within a secure computer network domain.

Upon expiration of the TTL, the mobile device may request a new token from a token server maintained by the service provider in the network. Based on the request, the token server may generate a new token with an updated TTL, store a record of the token on the hyperledger, and transmit the token to the mobile device to be stored in the non-transitory memory of the mobile device. In an embodiment, the mobile device requests a temporary upgrade in service based on the token and the network validates the token against the record stored in the hyperledger before granting the temporary upgrade in service. The upgrade in service may be time constrained according to the TTL associated with the token, where the service reverts to the mobile device's normal service (for example, according to the service plan associated with the mobile device) after the token expires.

The cell site associated with providing cellular service to a coverage area has various equipment, such as antennas, transceivers, receivers, and processors. The cell site may have a gigabit enhanced node B (gNB) comprising a packet scheduler that manages and schedules the packets of data to be transmitted in the network. In an embodiment, when a mobile device activates the alternative PRL in order to receive the temporary upgrade in service, the packet scheduler may direct packets from the mobile device to be transmitted on the allocated spectrum. When the alternative PRL expires or is deactivated, the initial PRL may be re-activated, and the packet scheduler may direct packets to be transmitted on the normal non-allocated spectrum according to the typical service plan the mobile device is provisioned to receive.

Turning now to FIG. 1, a communication system 100 is described. In an embodiment, the system 100 comprises a network 102, an access node 104, a mobile communication device (user equipment—UE) 106, and a preferred roaming list (PRL) server 108. The access node 104 may be a gNB, an enhanced node B (eNB), or another cell site. The network 102 may be one or more private networks, one or more public networks, or a combination thereof. It is understood that the system 100 may comprise any number of networks 102, cell sites 104, and UEs 106. Each network 102 may be maintained and operated by a different wireless communication service provider, and each network 102 may comprise any number of access nodes 104. The networks 102 may provide radio coverage in the same usage areas by using different radio spectrum frequency bands at the same time. In other words, the networks 102 may partially overlap spatially. Different service providers may own networks 102 that operate, at least partially, in the same region.

The UE 106 comprises a processor 112, at least one cellular radio transceiver 114, a graphical user interface (GUI) 116, and a memory 118 that stores an ad hoc service upgrade application 120. The ad hoc service upgrade application 120 may be stored in a non-transitory portion of the memory 118. The UE 106 is one of a cell phone, a mobile phone, a smart phone, a personal digital assistant (PDA), an Internet of things (IoT) device, a wearable computer, a headset computer, a laptop computer, a tablet computer, or a notebook computer. The ad hoc service upgrade application 120 may be encapsulated in an operating system of the mobile communication device 106. In some embodiments, the ad hoc service upgrade application 120 may be a distributed application. The radio transceiver 114 is able to establish a wireless communication link with an access node 104 according to one or more of a 5G, a long-term evolution (LTE), a code division multiple access (CDMA), a global system for mobile communications (GSM) wireless communication protocol, or WiFi (IEEE 802.11). The access node 104 communicatively couples the UE 106 to the network 102 and therethrough to communication terminals such as other UEs, web sites, and other communication destinations.

The memory 118 of UE 106 further comprises a plurality of preferred roaming lists (PRLs) 122. A PRL 122 is a data file that includes a prioritized listing of communication systems (such as networks 102) that the UE 106 may access. The PRL 122 provides information about the preferred networks 102 in the region to be offered to the UE 106. For each network 102 listed in the PRL 122, the PRL 122 may specify corresponding access data, such as radio frequency and system/network identifiers (SIDs/NIDs). Using that data, the UE 106 then searches for a network 102 in the order that the networks 102 are listed in the PRL 122, and then attempts to register with the highest priority network 102 it finds, proceeding down the list until it successfully connects with a network 102. In an embodiment, more than one PRL 122 may be stored at a given time, where one PRL 122 is activated and the remaining PRLs are deactivated. One or more PRLs 122 may be pre-loaded onto a UE 106, additional PRLs 122 may be loaded to the UE 106, and PRLs 122 stored on the UE 106 may also be updated and revised by the service provider. The service provider may send updated PRLs via PRL server 108.

There may be some instances where a network 102 operated by a first service provider is experiencing unusually high cellular traffic. Overburdened network resources may cause a delay in cellular service or a failure to transmit data entirely. In an embodiment, the ad hoc service upgrade application 120 executes on the processor 112 of the UE 106 and monitors cellular communication via the cellular transceivers 114. When the ad hoc service upgrade application 120 senses network congestion, for example, when data packets are failing to transmit or taking a significant amount of time to transmit, the ad hoc service upgrade application 120 may generate a prompt on the GUI 116. The GUI 116 may be presented by the ad hoc service upgrade application 120 on a display of the UE 106, for example on a touchscreen display. The GUI 116 presents to the subscriber the option to purchase a higher QoS for a limited period of time. The limited period of time may be one hours, two hours, four hours, one day, or some other period of time.

The network 102 further comprises a pricing server 110 that executes a pricing application 126. The GUI 116 may display a list of time periods, each with a corresponding price. In an embodiment, the price may be dynamically determined by the pricing application 126 based on a plurality of factors, such as the available network resources in the allocated spectrum at the current time, the number of subscribers in the coverage area, the demand for upgraded QoS, or other factors. In an embodiment, as more and more subscribers opt to receive a temporary upgraded QoS, the pricing application 126 may dynamically increase the price as the allocated spectrum experiences more traffic. In some instances, the option to pay for a temporary upgraded QoS may be paused in order to maintain the upgraded nature of the allocated spectrum and prevent it from experiencing network strain.

In an embodiment, the subscriber elects to receive the temporary upgraded QoS on the GUI 116, for example, through selecting the period of time via a touchscreen interface of the UE 106. The PRL server 108 sends an alternative PRL 122 to the UE 106 that contains SIDs and/or NIDs associated with providing the upgraded QoS on the allocated spectrum. Alternatively, one or more alternative PRLs 122 may be preloaded on the UE 106. For example, when the subscriber regularly travels to a certain city for business or personal reasons, the service provider may preload an alternative PRL 122 via the PRL server 108 prior to the travelling that may be used to provide a temporary upgraded QoS to the UE 106. The service provider may also preload an alternative PRL 122 via the PRL server 108 based on activity from other UEs 106 in the region. For example, if other UEs 106 on the service provider's network are electing to receive temporary upgrades to QoS, the PRL server 108 may preload the alternative PRL 122 on the subscriber's UE 106 upon detecting that the subscriber has also travelled to the region. In some instances, preloading alternative PRLs 122 may be determined based on a form of machine learning. For example, the service provider may analyze a record of subscribers that have been presented with the option to receive a temporary upgraded QoS, the various price points and time periods associated with the option, and the subscribers that ultimately opt to pay to receive the temporary upgraded QoS. The service provider may adapt the logic associated with preloading PRLs 122 based on the analysis to improve the rate at which subscribers accept to receive or activate the temporary upgraded QoS. For example, if subscribers travelling to a city, such as New York City, to attend an event, such as a sporting event, concert, parade, or holiday celebration, are being presented with and ultimately accept the option to receive temporary upgraded QoS, the service provider may preload a PRL 122 on the UE 106 associated with a subscriber that has also recently travelled to New York City.

In an embodiment, the preloaded PRLs 122 may be based on different categories of users. The categories of users may be determined based on historical data associated with a subscriber's wireless communication habits, demographics information of the subscriber's account, or other factors. For example, users may be categorized based on account information, such as billing options (e.g., pre-paid or post-paid plan), cellular service plan (e.g., premium or basic coverage), and/or classification of cellular service plan (e.g., corporate, business, or personal plan). Travel habits may also be accounted for, for example if a subscriber travels repeatedly to a geographic region outside of the "home" coverage area associated with the UE 106, an alternative PRL 122 may be preloaded on the UE 106 that would be able to be used by the UE 106 to provide an ad hoc temporary upgraded QoS.

After receiving the alternative PRL 122 or upon receiving an input to activate a preloaded alternative PRL 122, the ad hoc service upgrade application 120 activates the alternative PRL 122 that the UE 106 uses to receive the ad hoc temporary upgraded QoS. The alternative PRL 122 is activated for the period of time that the subscriber has agreed to receive the upgraded service. When the period of time expires, the ad hoc service upgrade application 120 deactivates the alternative PRL 122 and reactivates the initial PRL 122 that provides the UE 106 with the QoS according to the service plan.

The access node 104 identified by the alternative PRL 122 comprises various hardware and software components, such as a packet scheduler that manages and schedules the packets of data to be transmitted in the network 102. In an embodiment, when a UE 106 activates the alternative PRL 122 in order to receive the temporary upgraded QoS, the packet scheduler may direct packets from the UE 106 to be transmitted on the allocated spectrum.

The system 100 further comprises a token server 128 and a token data store 130. The token server 128 may create and authenticate tokens 124 to be used by the UE 106 to request to receive a temporary upgraded QoS. The token server 128 may be maintained by the service provider. The token 124 may be stored in the memory 118 of the UE 106. The token 124 may comprise a time to live (TTL), where upon expiration of the TTL, the network 102 denies the request for the temporary upgraded QoS. In an embodiment, records of the tokens 124 and each token's TTL are stored in a blockchain and/or hyperledger in a data store, such as the token data store 130, whereby authentically generated tokens may be securely and incorruptibly stored. Upon expiration of the TTL, the UE 106 may request a new token 124 with an updated TTL from the token server 128.

Based on the request, the token server 128 then generates a new token 124 with the updated TTL, stores a record of the token 124 on the hyperledger (i.e., the token data store 130), and transmits the token 124 to be stored in the memory 118 of the UE 106. In an embodiment, when the UE 106 requests a temporary upgrade in service, the network 102 validates the token 124 against the record stored in the hyperledger before granting the temporary upgrade in service. The upgrade in service may be time constrained according to the TTL associated with the token 124, where the service reverts to normal service (for example, according to the service plan associated with the mobile device) after the token 124 expires.

Figure 2:
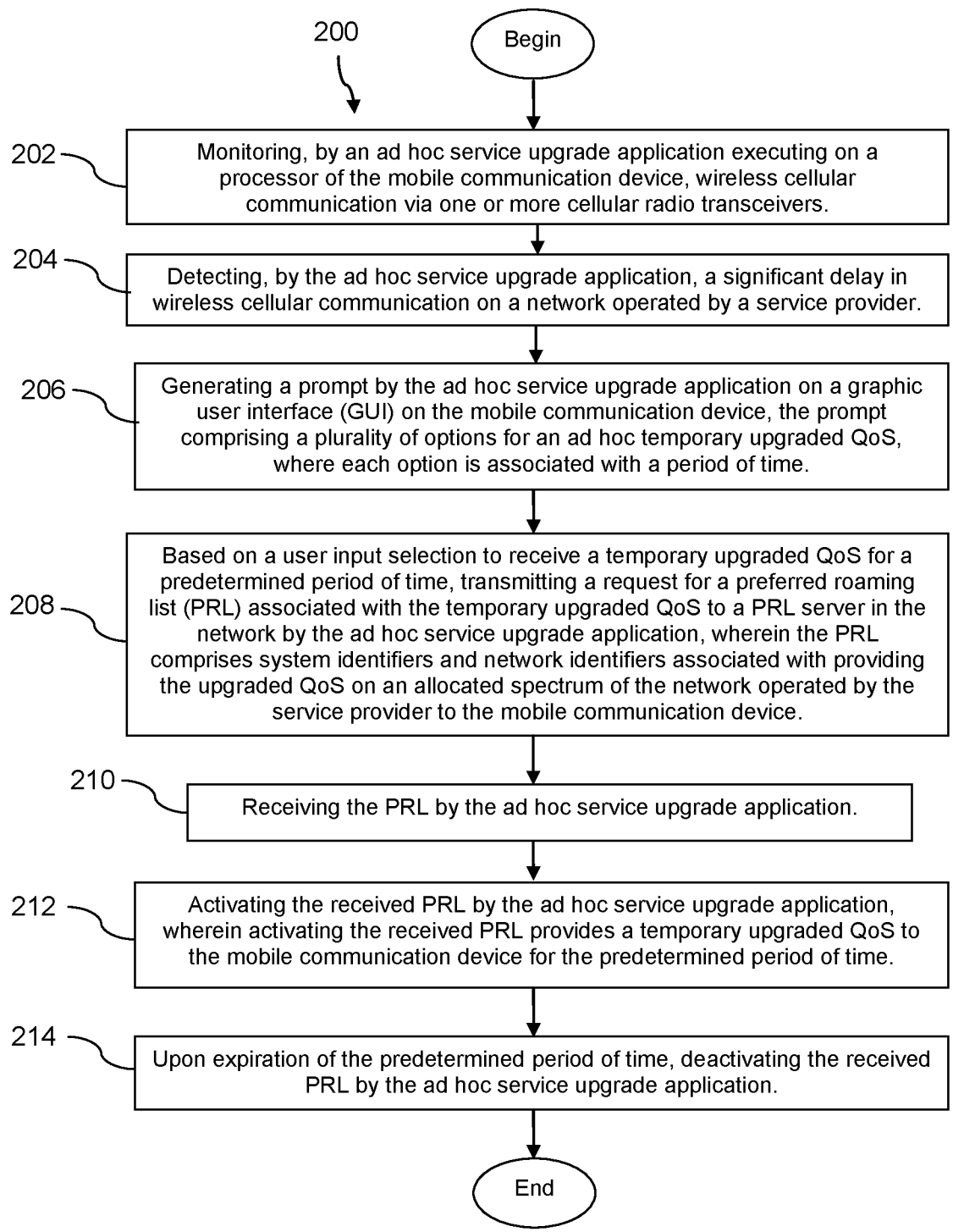
FIG. 2 is a flow chart of a method according to an embodiment of the disclosure.

Turning now to FIG. 2, a method 200 is described. In an embodiment, the method 200 comprises a method of providing an ad hoc temporary upgrade in QoS to a mobile communication device. At block 202, the method 200 comprises monitoring, by an ad hoc service upgrade application executing on a processor of the mobile communication device, wireless cellular communication via one or more cellular radio transceivers. At block 204, the method 200 comprises detecting, by the ad hoc service upgrade application, a significant delay in wireless cellular communication on a network operated by a service provider. In an embodiment, a significant network delay may occur when the ad hoc service upgrade application 120 detects that data packets from the UE 106 are not successfully transmitted over the network 102 by the one or more cellular radio transceivers 114. At block 206, the method 200 comprises generating a prompt by the ad hoc service upgrade application on a graphic user interface (GUI) on the mobile communication device, the prompt comprising a plurality of options for an ad hoc temporary upgraded QoS, where each option is associated with a period of time. The prompt on the GUI may comprise a list of prices determined by the pricing application 126 executing on the pricing server 110, where each price is associated with an option for temporary upgraded QoS. In an embodiment, the prices may be dynamically determined by the pricing application 126 based on current network conditions.

At block 208, the method 200 further comprises based on a user input selection to receive a temporary upgraded QoS for a predetermined period of time, transmitting a request for a preferred roaming list (PRL) associated with the temporary upgraded QoS to PRL server in the network by the ad hoc service upgrade application, wherein the PRL comprises system identifiers and network identifiers associated with providing the upgraded QoS on an allocated spectrum of the network operated by the service provider to the mobile communication device. At block 210, the method 200 comprises receiving the PRL by the ad hoc service upgrade application. At block 212, the method 200 comprises activating the received PRL by the ad hoc service upgrade application, wherein activating the received PRL provides a temporary upgraded QoS to the mobile communication device for the predetermined period of time. At block 214, the method 200 comprises, upon expiration of the predetermined period of time, deactivating the received PRL by the ad hoc service upgrade application. In an embodiment, upon deactivation, the received PRL 122 may be deleted from the UE 106.

Figure 3:
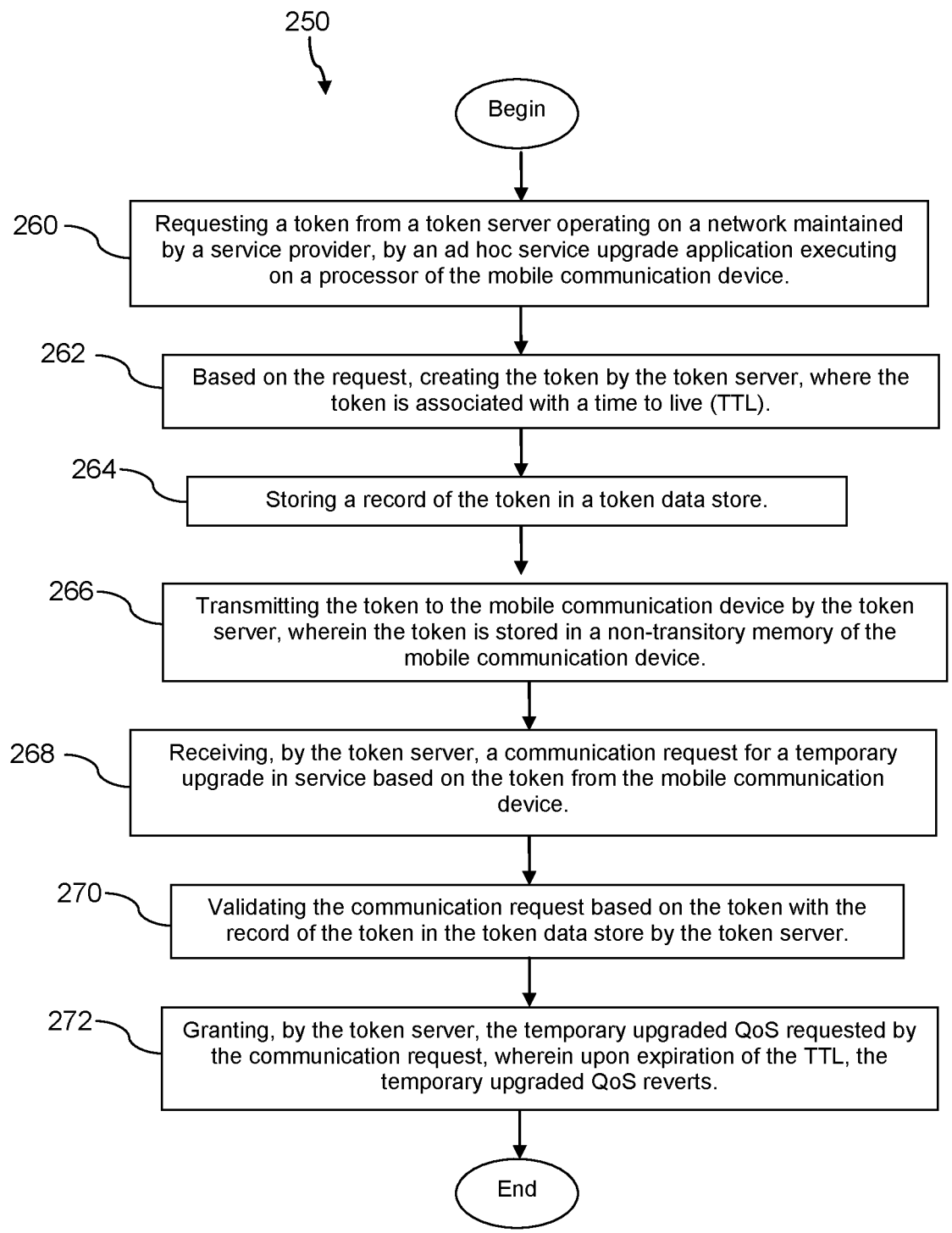
FIG. 3 is a flow chart of another method according to an embodiment of the disclosure.

Turning now to FIG. 3, a method 250 is described. In an embodiment, the method 250 comprises a method of providing an ad hoc temporary upgrade in quality of service to a mobile communication device. At block 260, the method 250 comprises, requesting a token from a token server operating on a network maintained by a service provider, by an ad hoc service upgrade application executing on a processor of the mobile communication device. At block 262, the method 250 further comprises based on the request, creating the token by the token server, where the token is associated with a time to live (TTL). At block 264, the method 250 comprises storing a record of the token in a token data store. In an embodiment, the record of the token is stored on the token data store 130 in a hyperledger and/or blockchain maintained by the service provider.

The method 250 comprises, at block 266, transmitting the token to the mobile communication device by the token server, wherein the token is stored in a non-transitory memory of the mobile communication device. At block 268, the method 250 comprises receiving, by the token server, a communication request for a temporary upgrade in service based on the token from the mobile communication device. At block 270, the method 250 comprises validating the communication request based on the token with the record of the token in the token data store by the token server. At block 272, the method 250 comprises granting, by the token server, the temporary upgraded QoS requested by the communication request, wherein upon expiration of the TTL, the temporary upgraded QoS reverts.

Figure 4:
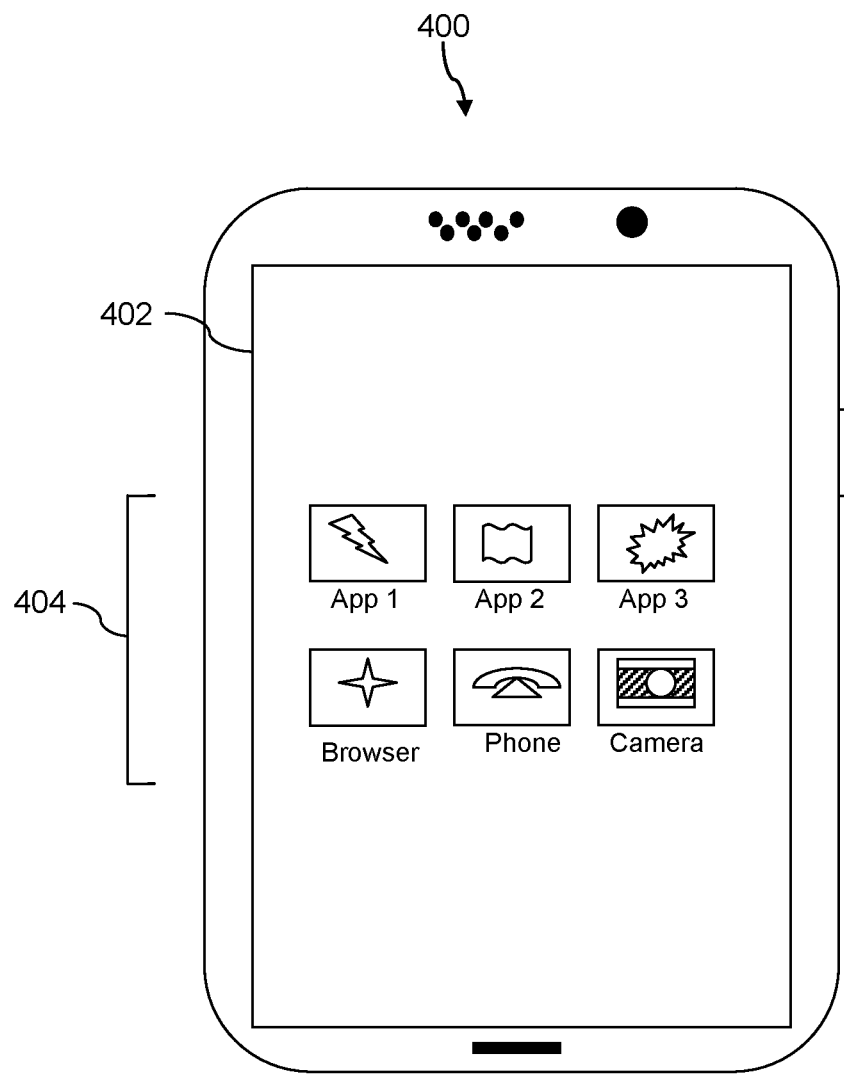
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
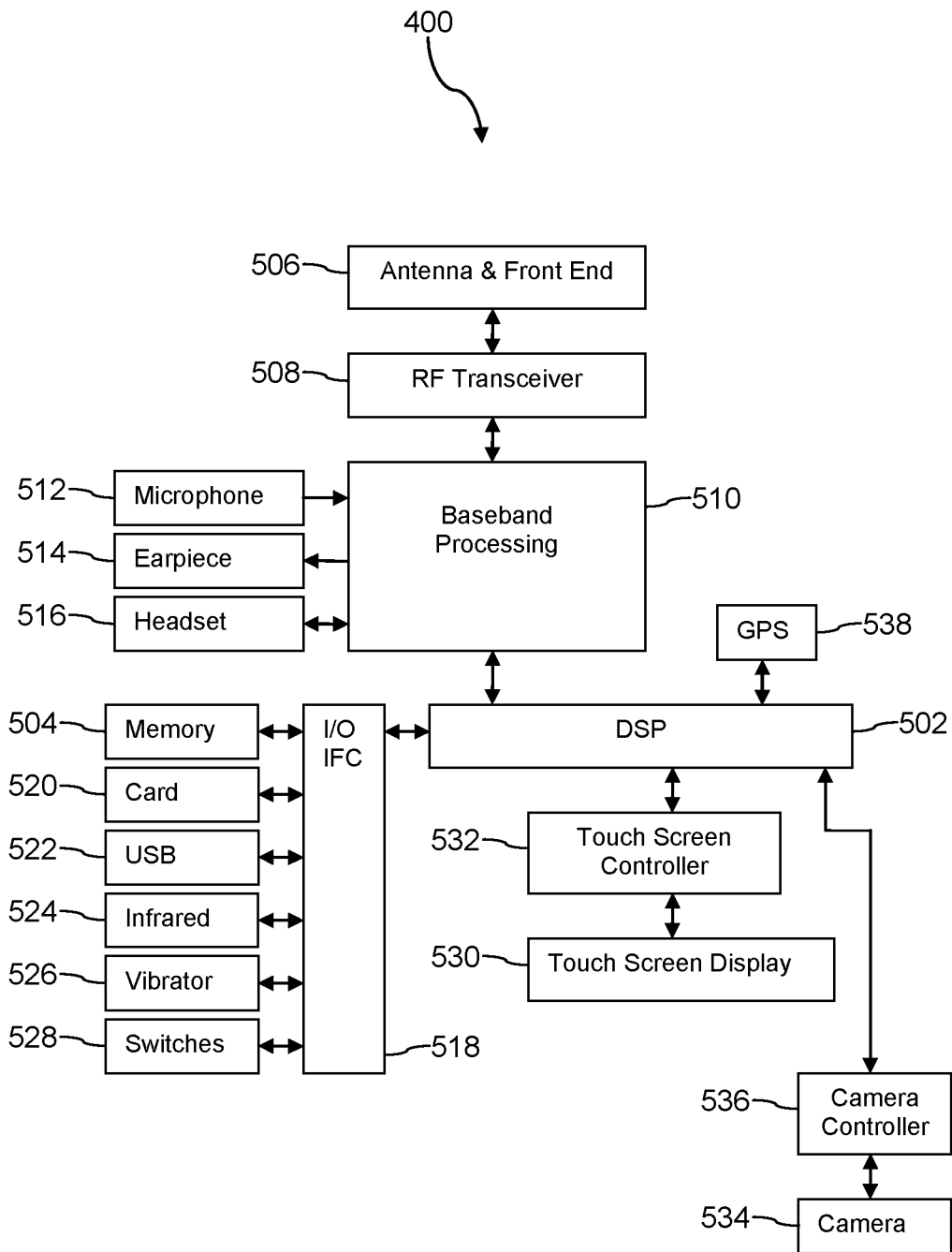
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with an access node according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
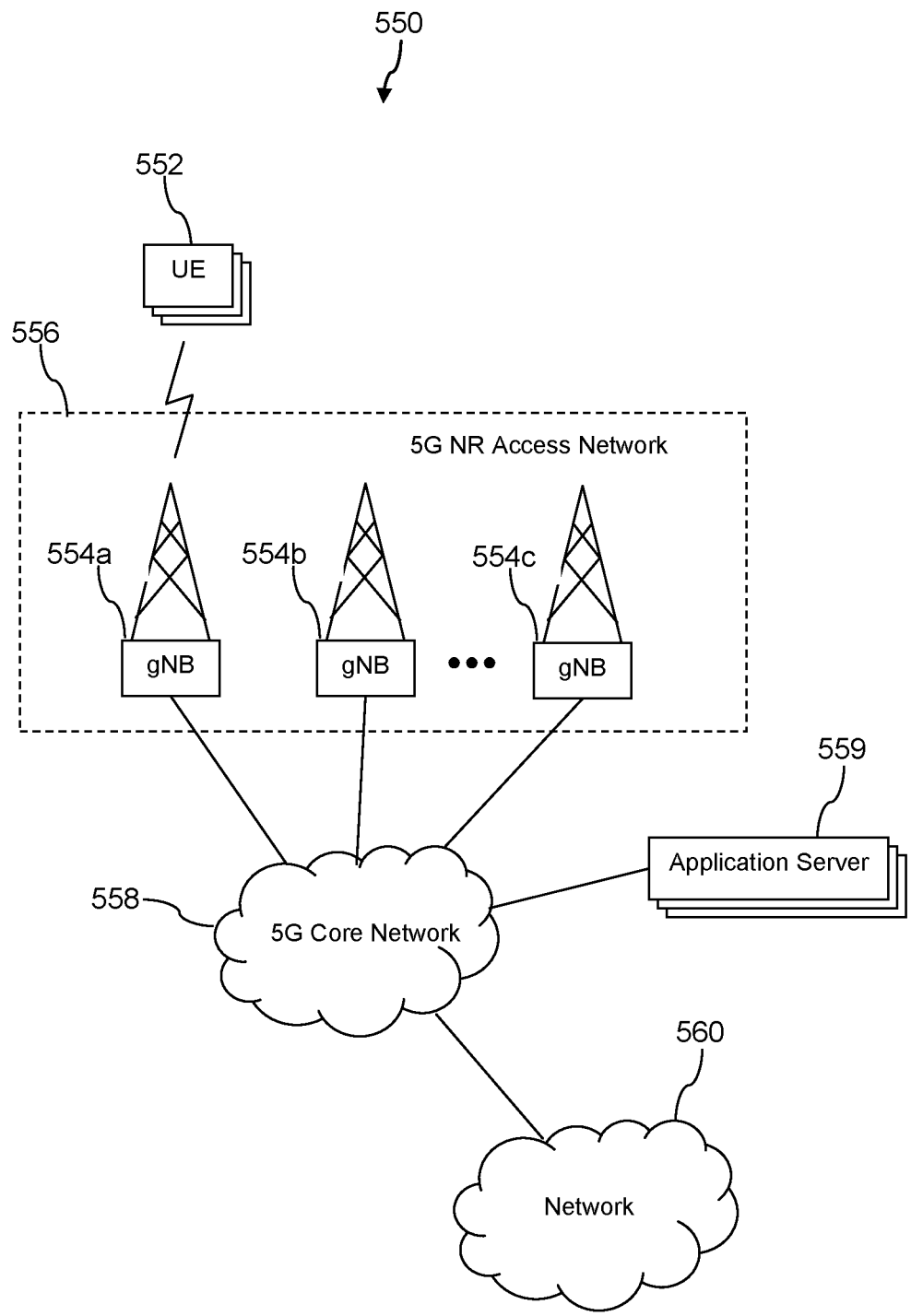
FIG. 6A is a block diagram of a communication system according to an embodiment of the disclosure.

Turning now to FIG. 6A, an exemplary communication system 550 is described. It will be appreciated that some of the communication system 100, described above with reference to FIG. 1, FIG. 2, and FIG. 3 may be provided by the communication system 550. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
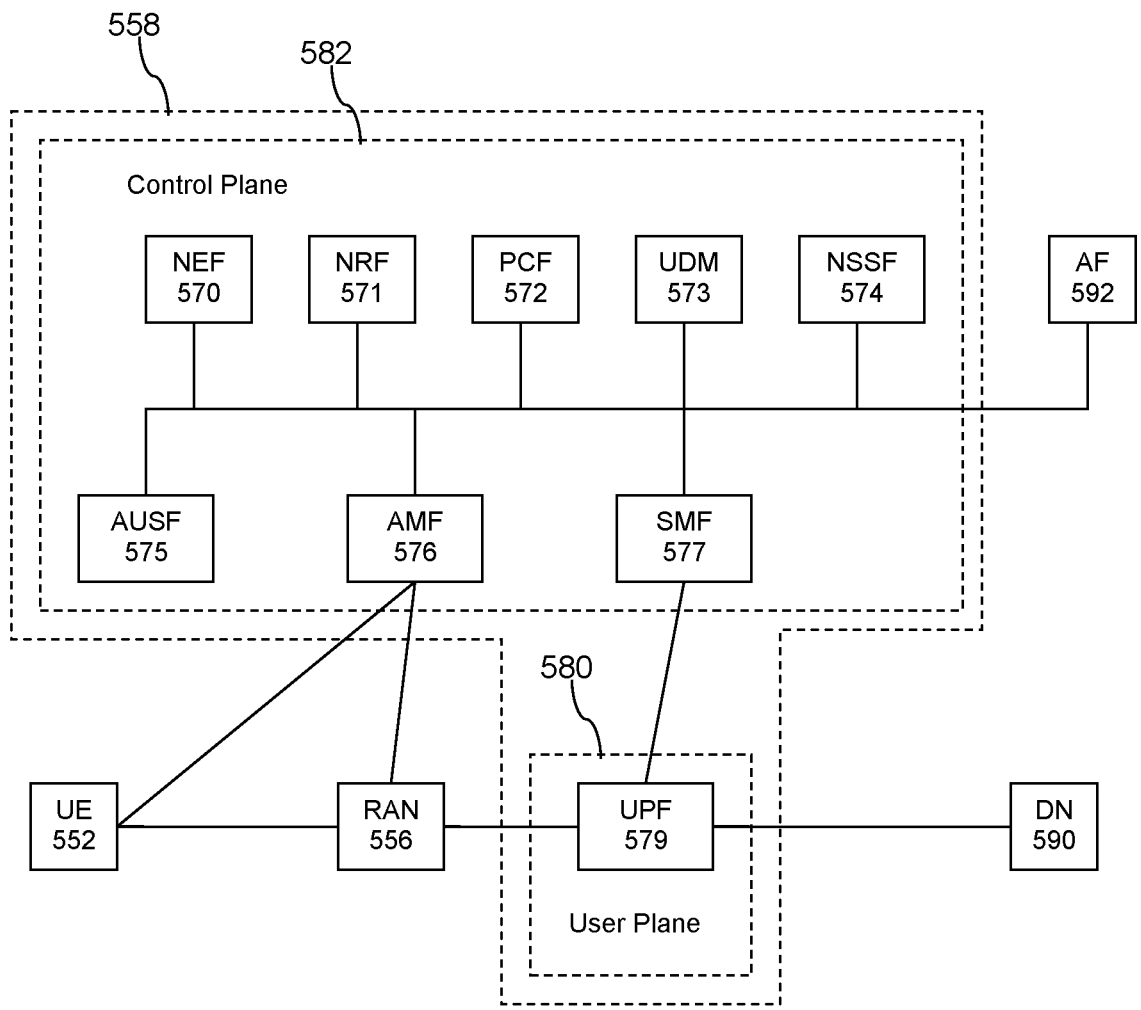
FIG. 6B is a block diagram of a 5G core network according to an embodiment of the disclosure.

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access node 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7A:
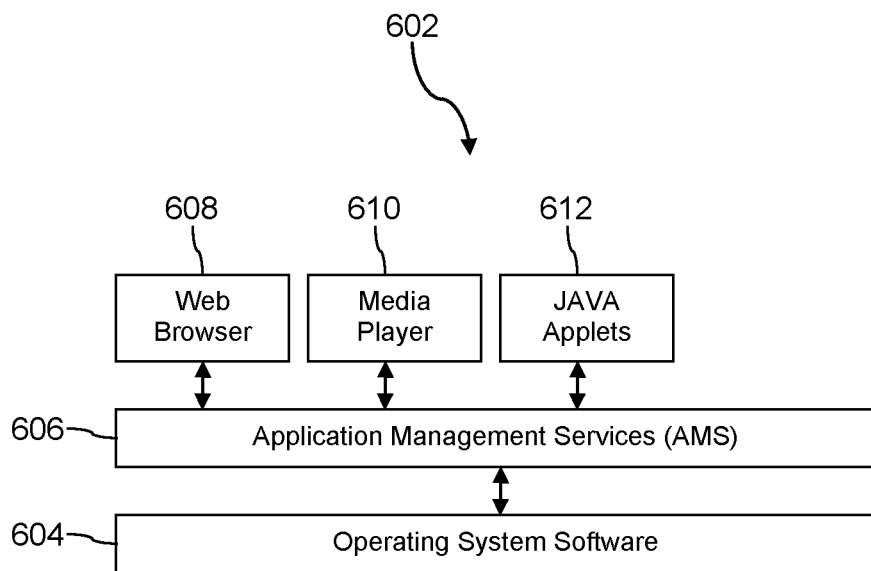
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
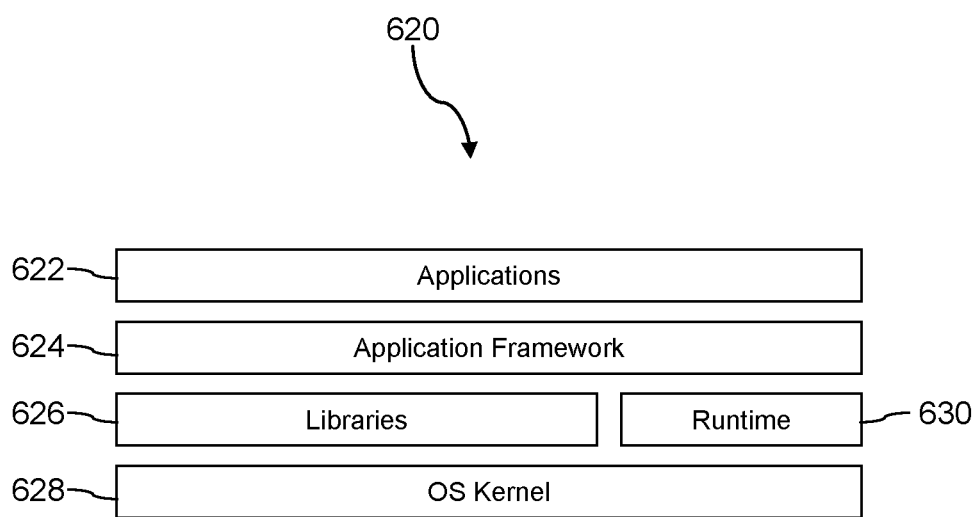
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
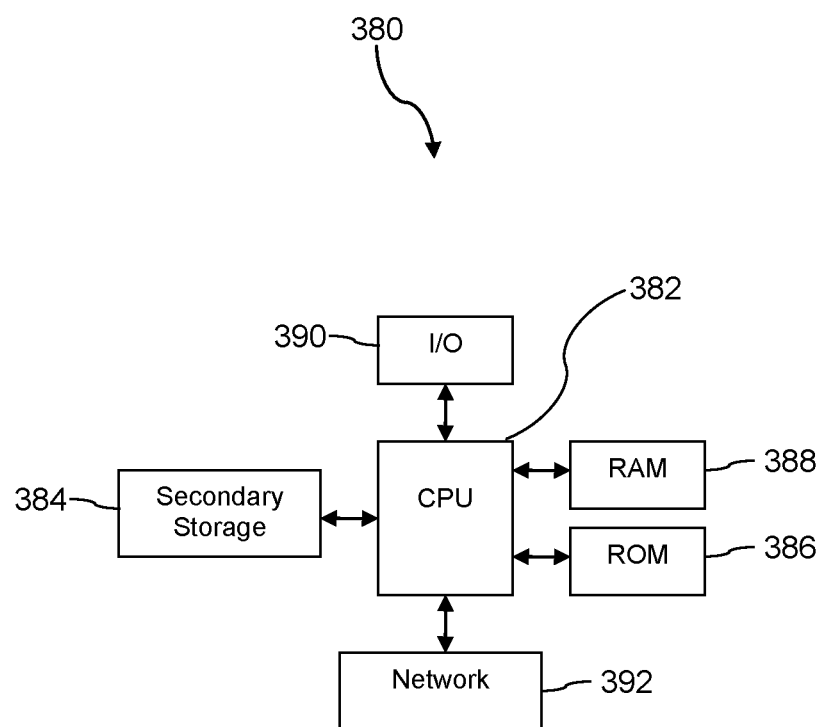
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device for receiving an ad hoc temporary upgrade in quality of service, comprising:
    a processor;
    at least one cellular radio transceiver;
    a non-transitory memory; and
    an ad hoc service upgrade application stored in the non-transitory memory that, when executed by the processor:
        monitors wireless cellular communication on a network operated by a service provider via the at least one cellular radio transceiver;
        detects a significant delay in the wireless cellular communication;
        responsive to detection of the significant delay and the mobile communication device being eligible for increased Quality of Service (QoS) options, generates a prompt on a graphic user interface (GUI) on the mobile communication device, the prompt comprising a plurality of options for an ad hoc temporary upgraded QoS, where each option is associated with a period of time;
        based on a user input selection to receive a temporary upgraded QoS for a predetermined period of time, requests a preferred roaming list (PRL) associated with the temporary upgraded QoS from a PRL server in the network;
        receives the PRL from the PRL server, wherein the PRL comprises system identifiers and network identifiers associated with providing the upgraded QoS on an allocated spectrum of the network;
        activates the received PRL, wherein activating the received PRL provides a temporary upgraded QoS to the mobile communication device for the predetermined period of time; and
        upon expiration of the predetermined period of time, deactivates the received PRL.

2. The mobile communication device of claim 1, wherein the mobile communication device establishes wireless communication service with the network associated with at least one of a 5G, a long term evolution (LTE), a code division multiple access (CDMA), or a global system for mobile communications (GSM) telecommunications protocol.

3. The mobile communication device of claim 1, wherein the mobile communication device is one of a cell phone, a mobile phone, a smart phone, a personal digital assistant (PDA), an Internet of things (IoT) device, a wearable computer, a headset computer, a laptop computer, a tablet computer, or a notebook computer.

4. The mobile communication device of claim 1, wherein the ad hoc service upgrade application is a distributed application.

5. The mobile communication device of claim 1, where more than one PRL may be stored in the non-transitory memory at a given time.

6. The mobile communication device of claim 1, wherein the received PRL is associated with a geographical region.

7. The mobile communication device of claim 1, where after the received PRL is deactivated, the ad hoc service upgrade application deletes the received PRL from the mobile communication device.

8. A method of providing an ad hoc temporary upgrade in quality of service to a mobile communication device, comprising:
    requesting a token from a token server operating on a network maintained by a service provider, by an ad hoc service upgrade application executing on a processor of the mobile communication device responsive to detection of a significant delay in a current service provided to the mobile communication device;
    based on the request, creating the token by the token server, where the token is associated with a time to live (TTL);
    storing a record of the token in a token data store;
    transmitting the token to the mobile communication device by the token server, wherein the token is stored in a non-transitory memory of the mobile communication device;
    receiving, by the token server, a communication request for a temporary upgrade in service based on the token from the mobile communication device;
    validating the communication request based on the token with the record of the token in the token data store by the token server; and
    granting, by the token server, the temporary upgraded QoS requested by the communication request, wherein upon expiration of the TTL, the temporary upgraded QoS reverts.

9. The method of claim 8, further comprising, upon expiration of the TTL, requesting a new token comprising an updated TTL from the token server by the ad hoc service upgrade application.

10. The method of claim 8, wherein the records of the tokens are stored in a hyperledger maintained by the service provider.

11. The method of claim 8, where the TTL is one of one hour, four hours, six hours, twelve hours, or one day.

12. The method of claim 8, where the temporary upgraded QoS is provided on an allocated spectrum on the network operated by the service provider.

13. The method of claim 12, where the service provider allocates five percent, ten percent, or fifteen percent of the spectrum to the allocated spectrum.

14. The method of claim 12, where the percentage of spectrum associated with the allocated spectrum is allocated dynamically based on the levels of cellular activity on the service provider's network.

15. A method of providing an ad hoc temporary upgrade in quality of service (QoS) to a mobile communication device, comprising:

monitoring, by an ad hoc service upgrade application executing on a processor of the mobile communication device, wireless cellular communication via one or more cellular radio transceivers;

detecting, by the ad hoc service upgrade application, a significant delay in wireless cellular communication on a network operated by a service provider;

upon detecting the significant network delay, requesting a list of prices associated with each of the plurality of options for an ad hoc temporary upgraded QoS from a pricing server in the network by the ad hoc service upgrade application, wherein the price is determined dynamically by the pricing server based on a plurality of factors;

receiving, by the ad hoc service upgrade application, the list of prices from the pricing server;

responsive to receipt of the list of prices, generating a prompt by the ad hoc service upgrade application on a graphic user interface (GUI) on the mobile communication device, the prompt comprising a plurality of options for an ad hoc temporary upgraded QoS, where each option is associated with a period of time, and the prompt includes the list of prices determined by the pricing server;

based on a user input selection to receive a temporary upgraded QoS for a predetermined period of time, transmitting a request for a preferred roaming list (PRL) associated with the temporary upgraded QoS to a PRL server in the network by the ad hoc service upgrade application, wherein the PRL comprises system identifiers and network identifiers associated with providing the upgraded QoS on an allocated spectrum of the network operated by the service provider to the mobile communication device;

receiving the PRL by the ad hoc service upgrade application;

activating the received PRL by the ad hoc service upgrade application, wherein activating the received PRL provides a temporary upgraded QoS to the mobile communication device for the predetermined period of time; and upon expiration of the predetermined period of time, deactivating the received PRL by the ad hoc service upgrade application.

16. The method of claim 15, wherein the plurality of factors is one or more of availability of network resources in the allocated spectrum at the current time, the number of subscribers in the coverage area, and the demand for upgraded QoS.

17. The method of claim 15, wherein the PRL is preloaded on the mobile communication device.

18. The method of claim 17, wherein the PRL is preloaded based on:

analyzing a history of prompts presented on the GUI and users opting to receive temporary upgraded QoS based on the prompt; and adapting the logic associated with preloading the PRL on the mobile communication device.

19. The method of claim 15, wherein based on the received PRL, a packet scheduler in the network directs data packets to be transmitted on the allocated spectrum.

\* \* \* \* \*